United States Patent

[11] 3,528,362

| [72] | Inventor | Fred W. Arnold, Jr.<br>Eastman, Georgia |
|---|---|---|
| [21] | Appl. No. | 749,228 |
| [22] | Filed | April 25, 1968<br>Division of Ser. No. 439,689, filed Mar. 15, 1965, now Pat. No. 3,383,220. |
| [45] | Patented | Sept. 15, 1970 |
| [73] | Assignee | Pet Incorporated<br>St. Louis, Missouri<br>a corporation of Delaware |

[54] INFRARED OVEN FOR ROASTING
9 Claims, 2 Drawing Figs.

[52] U.S. Cl. .................................................. 99/357,
99/386, 99/443, 99/127
[51] Int. Cl. .................................................. A47j 37/00
[50] Field of Search .................................. 99/443,
386, 401, 391, 387, 389, 357, 355, 127

[56] References Cited
UNITED STATES PATENTS

| 2,340,354 | 2/1944 | Wells | 99/386 |
| 2,504,110 | 4/1950 | Davis | 99/386X |
| 2,584,584 | 2/1952 | Hoffman | 99/386X |
| 2,807,550 | 9/1957 | Zarotschenzeff | 99/386 |
| 2,864,932 | 12/1958 | Forrer | 99/389 |

*Primary Examiner*—Robert W. Jenkins
*Attorney*—Gravely, Lieder and Woodruff

ABSTRACT: A nut roaster includes an endless wire mesh belt having a conveying pass which extends through a chamber. The chamber contains reflectors which face each side of the conveying pass and infra red heaters which are positioned adjacent to the reflectors for heating the nuts on the conveying pass. An airstream is drawn through the chamber along the conveying pass.

Patented Sept. 15, 1970 3,528,362
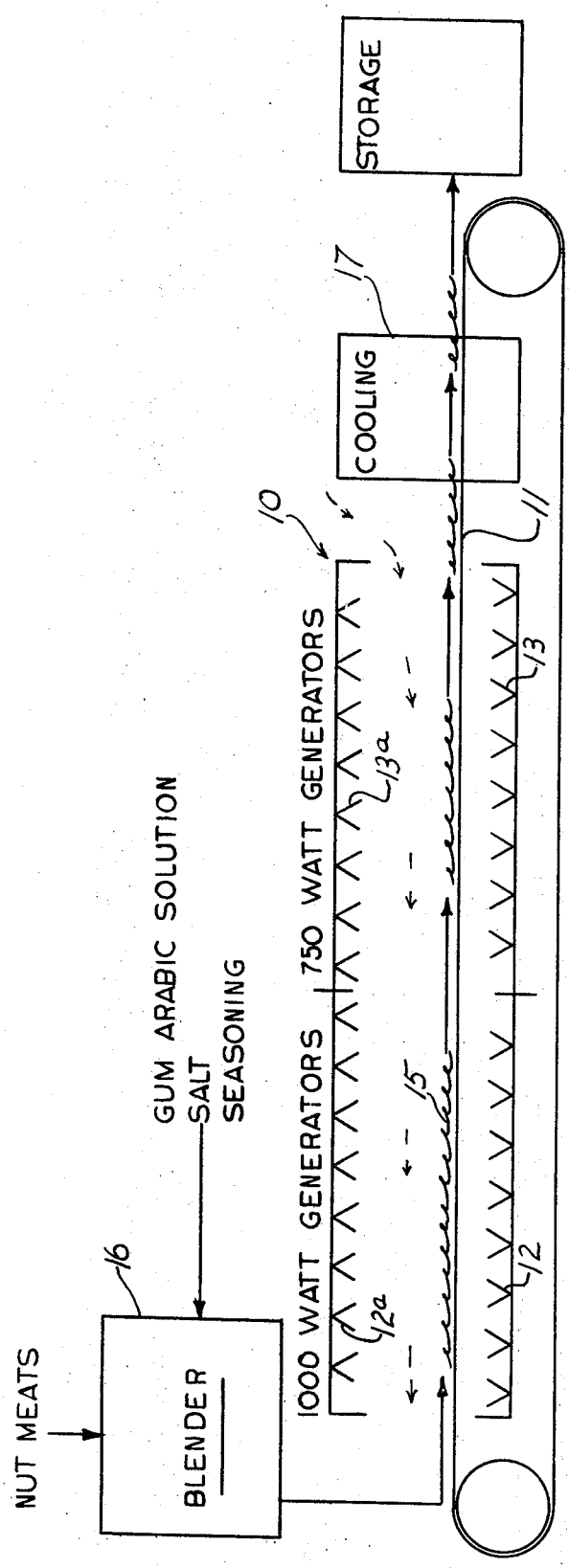
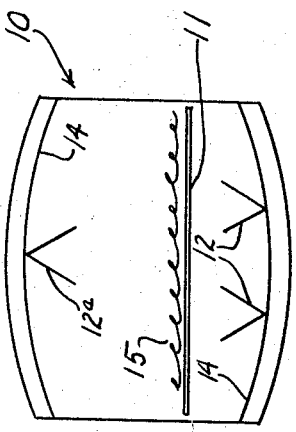
INVENTOR
FRED W. ARNOLD JR.

INFRARED OVEN FOR ROASTING

This application is a division of application Ser. No. 439,689, filed March 15, 1965, now U.S. Pat. No. 3,383,220.

This invention relates to a food process, and particularly to a dry roast process for nutmeats (containing no sugar or oils) but having a protective film of vegetable gum (Gum Arabic), salt, and spices. This coating retards rancidity of the nut oils, and makes a more palatable nutmeat which can be eaten without the heretofore inherent disadvantages of nuts, namely the tendency to make consumers' fingers greasy and to stain articles that come in contact with the nuts. This invention further relates to the use of an infra red tunnel or oven which both conditions and cures the coating and nut under a low ambient heat with no appreciable loss of volate aromatic oils which are developed and retained in the protective coating.

In the usual methods of preparation of nuts for the market, the shelled nut meats are cooked or roasted in an edible oil or dry roasted in convection heat roasters. The roasted nuts are then coated again in an edible oil or fat and salted. The resultant product has many disadvantages. The coating required for the adherence of the salt makes for a greasy product so that consumers' fingers become oily and articles in contact with nuts become stained. This oil coating in itself does not hold the salt securely, and upon handling, the salt tends to settle to the bottom of the package. Thus the nuts at the top of the package have too little salt and those at the bottom have too much.

The principal object of this invention is to take the delicately flavored, fragile, whole pecan nut halves and coat them in their raw shelled state with a protective coating of vegetable gum (Gum Arabic) salt, and spices, and pass the coated nuts through a controlled infra red tunnel or oven at a regulated forward speed on a stainless steel wire mesh belt with no other agitation.

Another object is to provide a method of roasting and coating nuts with a dry protective coating containing seasonings.

Another object of the present invention is to provide a dry roasted coated nut meat which is clean to handle and is of superior flavor.

These and other objects and advantages will become apparent hereinafter.

The timing and control of the roasting operation is important, as by this means the conditioning may be prolonged or shortened as the occasion demands to accommodate the processing of different kinds of nut meats. Furthermore, the protective coating of vegetable gum and spices becomes a crisp coating in an ascending degree; beginning at the entrance of the tunnel or oven as an elastic film which holds in the volatile aromatic nut oils until full crispness has been reached at the point of delivery, where cool air is drawn through the nuts completing the cycle with very little or no breakage of the pecans. In all other methods known to me, the pecans, when subjected to any brisk motion, quickly break before reaching the desired phase for crispness.

In other not so delicate nutmeats, such as peanuts, a partial dehydration in a conventional commercial roasting unit (such as a Bauer Gas Fired Unit) is accomplished in order to reduce moisture content of the dehydrated nutmeats to about 2.0 percent. From observation the longest portion of a roasting period effects a dehydration of nutmeats with very little, if any, attendant real roasting thereof, and that the final and relatively short phase of the cycle will bring about rapid roasting. This preliminary or dehydrating phase of the cycle will vary in length of time depending on the condition of the nutmeats which are affected by age, variety, and moisture content.

In carrying out the process of this invention, with particular reference to pecans, a number of factors must be taken into consideration. The revolving pan in which nuts are coated with vegetable gum, salt and spices is to be rotated at a speed where tumbling action provides a continual reintroduction of surfaces to be coated. Thus if the pan is operating at too slow a speed, the component of centrifugal force will be insufficient to elevate the nuts to be properly coated, such that it will not tumble the nuts downward. On the other hand, if the pan is rotated too fast, frictional forces tend to counterbalance the force of gravity so that tumbling action is not provided and as a result effective fixation of the coating on the nuts is not obtained. This balance is found to be about 18 r.p.m. (revolutions per minute) for pecans. Depending on the size of the pan and inclination, this speed may vary somewhat, but generally the nuts should drop before they reach the 12 o'clock position, preferably at about the 10 o'clock position. Following the complete coating of the nuts, it will be observed that on removal from the revolving pan they are throughly and evenly coated, even the most irregular nuts.

The foregoing description of pre-dehydrating is a batch type method and can be made part of a continuous process. Similarly, the operation of coating the nutmeats can be done by using a commercial type screw or any type feed which advances nutmeats to be coated, rotating within a complementary barrel with provision for adding gum and spices, and directly feeding to the infra red tunnel.

The present invention comprises a process for roasting and coating nut meats without breaking the same so as to produce a whole, good tasting nutmeat.

The invention further consists in the processes hereinafter described and claimed, and in the nutmeats made by said processes.

The primary aims of this invention are to produce:

1. A dry roasted whole pecan half with a unique and crispy piquant taste, retaining the sweet aromatic oils so characteristic of the pecan.

2. To seal in these nut oils in a crisp protective film against rancidity by processing through an infra red tunnel with a very elastic coating so that as the pecans progress through the oven, the film is able to expand with the formation of certain aromatical oils and lock the oils in, before the final crispy stage is reached at the terminal end of the oven. Cashews, peanuts, almonds and other nuts and seeds (such as sunflower, pinon, etc.) are all adapted to the foregoing method with certain variations.

In the accompanying drawings:

FIG. 1 is schematic side view of the present process and apparatus; and

FIG. 2 is a schematic vertical sectional view through the oven shown in FIG. 1.

FIGS. 1 and 2 show schematically the equipment and process which includes an infra red radiant heat tunnel 10 made of stainless steel with a stainless steel wire mesh belt 11 running through the center. About 6" below the belt 11 are placed in the first half of the tunnel 10 a bank of 16—1,000 watt infra red generators 12 (8 on each side of the oven 10 below the belt 11) and 8—1,000 watt infra red generators 12a down the center of the oven 10, about 12" above the belt for a total of 24—1,000 watt generators. In the second half of tunnel 10 similarly positioned are 24 more infra red generators 13 and 13a of only 750 watts each. The entire tunnel has a total of 48 infra red generators with parabolic reflectors 14 adapted to focus rays directly through the belt 11 and nuts 15. The generators 12, 12a, 13 and 13a are controlled by electric input controllers (not shown) from 100 percent to zero. One controller activates all 32 generators, 12 and 13 below the belt. Another controller activates all 16 generators 12a and 13a above the belt. Thus in principle, there are two distinct areas of infra red radiation. The entrance to the tunnel 10 for the first 7½ feet carries 24 × 1000 watts (each with an output of 1625°F). The delivery end of the tunnel 10 for the second 7½ feet carries 24 × 750 watts each with an output of 1300°F. Thus the entire tunnel 10 is under very rigid control. The tunnel 10 is 15 feet long, 2 feet high and 3 feet wide.

Unlike convention resistor type heaters where air is the primary source of heat transfer, infra red is electric magnetic energy that is projected and radiated from a source to direct impingement on the nutmeats. Radiation is the transfer of heat by means of radiant energy and when absorbed, it becomes heat energy. Infra red generators have emission temperature ranges from 620°F. to 4073°F. The higher temperatures produce short wave length heat energy and the lower temperatures produce longer wave length energy. More of the energy carried by long wave length emissions is absorbed by the product resulting in higher efficiencies.

The generators used in the tunnel 10 have emission temperatures of 1300° and 1625°F., which produce the longer wave lengths required for the process. The process uses reflecting surfaces in combination with high infra red reflection. When these are properly combined with a source rich in radiant component, high utilization of energy is possible. Efficiencies of 70 percent defined as heat in the nutmeat versus input energy are not uncommon.

Because the air is not the primary means of heat transfer, larger volumes of air are drawn through the tunnel 10 (indicated by the broken arrows in FIG. 1) which adds to greater efficiencies in operation and quality by driving off excess moisture and leaving a dry, crisp, clean product. The coating film (vegetable gum arabic) on which salt is of greater percentage and having a low specific heat, attains temperature quickly and aids in heat transfer by conduction from salt to nut.

Whether the molecular structure of the nut is altered or the organic structure is changed is not entirely clear, but whatever the change may be, the nutmeats are of high quality.

The following examples show preferred processes of utilizing the present invention.

EXAMPLE NO. 1

In processing dry roasted pecan halves, the nuts are placed in a revolving pan 16 in the raw state (when they are green and flexible) and gently wetted with gum arabic solution. The pan revolves at 18 r.p.m. and gently tumbles the nuts without any breakage. Salt and seasonings are added and the pan is run about 3 to 5 minutes more for a thorough coating. The whole pecan halves are then transferred to an infra red tunnel 10 with the stainless steel belt 11 running at a speed of 2 feet per minute. This allows the nuts to progressively move through the tunnel in 7 minutes. The tunnel controls are set with the top generators at 90 percent input and the bottom generators at 100 percent. In this Example No. 1, 50 lbs. of pecan halves having an initial moisture content of 4.5 percent are used. The moisture content of the nuts when finished is 0.5 percent.

EXAMPLE NO. 2

In processing dry roasted cashews, 250 lbs. of cashews are partially dry roasted in a commercial type dry roaster to a moisture content of 0.8 percent at a temperature of 325°F. for 18 minutes. Finishing weight at this stage is 240 lbs. This is equally divided into 3 parts of 80 lbs. each. 80 lbs. of these nuts are placed in revolving pan with speed of 18 r.p.m. and treated with a solution of gum arabic of 0.87 lbs. gum arabic on a dry basis. After tumbling for about 2 minutes, 1.75 lbs. of commercial seasoning is added with 1.75 lbs. salt. This mix is tumbled for 3 minutes more to give a thorough even coating. Total time in the pan is 5 minutes. Nuts are then transferred to a stainless steel wire mesh belt running at speed of 5 feet per minute through a 15 ft. infra red heated tunnel (oven). The top controllers are set at 70 percent input and the bottom controllers are set at 80 percent. The nuts spend 3 minutes in the oven and emerge at a temperature of 200°F. On emerging from the tunnel, the nuts are cooled at 17 to 100°F. in 1 minute by a fan pulling air through the nuts. The moisture content of the finished nuts is 0.5 percent.

EXAMPLE NO. 3

Three hundred lbs. blanched Virginia peanuts, with moisture content of 4.8 percent are dry roasted in commercial type gas dry roaster to a moisture content of 1.3 percent at a temperature of 325°F. for 25 minutes. Finishing weight of the nuts is 290 lbs. The nuts are equally divided into 3 parts of 97 lbs. 97 lbs. of these nuts are placed in revolving pan at speed of 18 r.p.m. and treated with an aqueous solution of gum arabic or 0.87 lbs. on a dry basis. After tumbling for about 2 minutes, 1.75 lbs. commercial seasoning is added with 1.75 lbs. salt. The nuts are tumbled for 2 minutes more to give a thorough even coating. The nuts are then transferred to a stainless steel wire belt running at a speed of 5 feet per minute through the 15 foot infra red tunnel. The upper controllers are set at 70 percent input and the bottom controllers are set at 90 percent input. The nuts travel through the oven in 3 minutes and reach a temperature of 250°F. On emerging from the tunnel, the nuts are cooled to 100°F. in 1 minute by pulling air through the nuts. The final moisture content of the nuts is 0.5 percent.

The gum arabic solution is formulated as follows:
2/3 water (by weight)
1/3 gum arabic (by weight).

The coating composition is prepared as follows:
0.87 lbs. gum arabic solution (dry solids base)
1.75 lbs. salt
1.75 lbs. commercial seasoning.

From 1 to 26 lbs. of nuts having an initial moisture content of about 3.5 to about 6.5 percent (as they enter the tunnel) can be used on each pass through the oven of 3 minute duration, or 520 lbs. per hour, maximum. The speed can vary from 3.75 to 5 feet per minute. The efficiencies of the upper generator is from 50 percent to 100 percent. The efficiencies of the lower generator is from 50 to 100 percent. The temperatures of the nutmeats entering the oven is about 65°F. to about 90°F. and leaving the oven is about 150°F. to about 300°F. The nutmeats can remain in the oven from 2 to 7 minutes. The nutmeats are cooled to a temperature of about 80° to 105°F.

The moisture content of the nutmeats leaving the oven is about 0.3 to about 0.7 percent.

The coating composition can contain from 30 percent to 40 percent gum arabic and salt and other seasonings as desired.

The upper generators are of 750 to 1000 wattage or 1000 to 1850°F. temperature and the lower generators are of 750 to 1000 wattage or 1000 to 1850°F. temperature. However, the temperature of the nutmeats themselves is the critical factor.

This invention is intended to cover all changes and modifications of the example of the invention herein chosen for purposes of the disclosure, which do not constitute departures from the spirit and scope of the invention.

I claim:

1. A nut roaster comprising a chamber, an endless belt formed from an open mesh material and having a conveying pass and a return pass, the conveying pass extending through the chamber for conveying nuts therethrough, first and second reflecting surfaces in the chamber, the first reflecting surface facing the conveying pass of the belt from between the conveying and return passes, the second reflecting surface facing the opposite side of the conveying pass so that the conveying pass extends between the first and second reflective surfaces, a first bank of infra red heaters positioned adjacent to the first reflective surface for directing radiant energy toward the nuts on the conveying pass of the endless belt, a second bank of infra red heaters positioned adjacent to the second reflector surface for directing radiant energy toward the nuts on the conveying surface, and means for directing an airstream in the chamber generally along the conveying pass of the belt for withdrawing moisture from the chamber.

2. A nut roaster according to claim 1 wherein the first bank of heaters is located closer to the conveying pass of the endless belt than the second bank.

3. A nut roaster according to claim 2 wherein the first bank of heaters produces more heat than the second bank of heaters.

4. A nut roaster according to claim 3 wherein the first and second banks of heaters are each segmented into at least two sections having different heat producing capabilities whereby the radiant energy directed toward the conveying pass varies through the interior of the chamber.

5. A nut roaster according to claim 3 wherein the first and second banks of heaters are independently controlled.

6. A heater according to claim 1 wherein the reflective surfaces are parabolic in shape and are oriented such that they direct the rays of radiant energy emitted from the heaters toward the conveying pass of the belt.

7. A heater according to claim 1 wherein the airstream moves along the conveying pass in a direction opposite to the direction of movement for the conveying pass.

8. A nut roaster according to claim 1 and further characterized by blending means for mixing the nuts with other ingredients, and cooling means for reducing the temperature of the nuts after they emerge from the chamber.

9. A nut roaster according to claim 8 wherein the blending means discharges onto the conveying pass of the endless belt ahead of the entrance to the chamber; and wherein the conveying pass of the endless belt passes through the cooling means.